(12) United States Patent
Tian

(10) Patent No.: US 11,771,063 B2
(45) Date of Patent: Oct. 3, 2023

(54) BIRD FEEDER PREVENTING FOOD FROM BEING STOLEN

(71) Applicant: Chuan Tian, Dao (CN)

(72) Inventor: Chuan Tian, Dao (CN)

( * ) Notice: Subject to any disclaimer, the term of this patent is extended or adjusted under 35 U.S.C. 154(b) by 0 days.

(21) Appl. No.: 18/096,582

(22) Filed: Jan. 13, 2023

(65) Prior Publication Data

US 2023/0146594 A1    May 11, 2023

(51) Int. Cl.
*A01K 39/01*    (2006.01)
*A01K 39/00*    (2006.01)

(52) U.S. Cl.
CPC ................................ *A01K 39/0113* (2013.01)

(58) Field of Classification Search
CPC .. A01K 39/0113; A01K 39/012; A01K 39/01; A01K 39/00
See application file for complete search history.

(56) References Cited

U.S. PATENT DOCUMENTS

| | | | | |
|---|---|---|---|---|
| 2,773,474 A * | 12/1956 | Dodds | ................... | A01K 39/012 |
| | | | | 119/55 |
| 3,083,687 A * | 4/1963 | Slaven | ................ | A01K 39/0113 |
| | | | | 119/52.2 |
| 5,048,461 A * | 9/1991 | Wessner | ............. | A01K 39/0113 |
| | | | | 119/52.3 |
| 5,105,765 A * | 4/1992 | Loken | ................... | A01K 39/012 |
| | | | | 119/52.3 |
| 5,255,631 A * | 10/1993 | Anderson | .......... | A01K 39/0113 |
| | | | | 119/52.2 |
| 6,543,383 B1 * | 4/2003 | Cote | .................... | A01K 39/012 |
| | | | | 119/52.2 |
| 7,198,004 B1 * | 4/2007 | Lush | ..................... | A01K 39/012 |
| | | | | 119/52.2 |
| 8,807,081 B1 * | 8/2014 | Gage | ...................... | A01K 31/12 |
| | | | | 119/52.3 |
| 9,131,665 B2 * | 9/2015 | MacKelvie | ............ | A01K 39/01 |

(Continued)

*Primary Examiner* — Kristen C Hayes
(74) *Attorney, Agent, or Firm* — Zhigang Ma

(57) ABSTRACT

The present disclosure provides a bird feeder preventing food from being stolen, the bird feeder includes an upper cover, a food storage pipe and a bottom cover, where the food storage pipe is provided with a food storage cavity, and the upper cover is connected to a pendant; feeding ports communicating with the food storage cavity are provided around a circumferential side of the bottom cover; and the bottom cover, at the feeding ports, may be rotationally connected to trays. Correspondingly to the feeding ports, the bottom cover is inwards and concavely provided with leak-proof portions, each leak-proof portion is provided with a first backstop surface extending vertically, an upper edge of the first backstop surface is externally extended with a second backstop surface, and one end, away from each first backstop surface, of each second backstop surface, is connected to each feeding port. A gap is kept between a lower part of each first backstop surface and each feeding port. Thus, by designing the bird feeder and disposing the leak-proof portions at the feeding ports of the bird feeder, birdseed may be prevented from falling outside the food storage cavity of the bird feeder from the feeding ports. Then the trays may be rotationally connected so that birds can stand stably for eating food while effectively preventing squirrels from stealing the food.

7 Claims, 10 Drawing Sheets

(56) References Cited

U.S. PATENT DOCUMENTS

| | | | |
|---|---|---|---|
| 2003/0136347 A1* | 7/2003 | Fasino | ............... A01K 39/0113 |
| | | | 119/57.9 |
| 2003/0200933 A1 | 10/2003 | Park | |
| 2007/0227454 A1* | 10/2007 | Fahey | .................. A01K 39/012 |
| | | | 119/57.8 |
| 2007/0266951 A1 | 11/2007 | Berns | |
| 2014/0116344 A1 | 5/2014 | Holscher | |
| 2020/0077627 A1* | 3/2020 | Combs | ............... A01K 39/0113 |

\* cited by examiner

BIRD FEEDER PREVENTING FOOD FROM BEING STOLEN

TECHNICAL FIELD

The present disclosure relates to the field of bird feeders, particularly a bird feeder that prevents food from being stolen.

BACKGROUND

Many bird sanctuaries or single-family residential buildings have bird feeders hanging in specific areas near them to feed some birds. Each bird feeder has a relatively simple structure and is usually composed of a food storage pipe for placing birdseed and a hook for hanging the food storage pipe in a tree; at the same time, trays through which the birds stand when eating food may be disposed at the bottom of the food storage pipe, and a plurality of feeding ports, through which the birds can eat birdseed, may be disposed on the food storage pipe. However, the feeding ports of the existing bird feeder are not reasonable enough, occasionally resulting in the birdseed falling from the feeding ports. At the same time, there are many kinds of animals in some bird sanctuaries, such as squirrels (specifically abroad) or some big birds, and these squirrels or big birds also usually come and steal the birdseed in the bird feeder, so an object (bird) being fed will not eat the food. Therefore, many manufacturers manufacturing the bird feeder have also modified the conventional bird feeder, for example, a sound device for expelling the squirrels or big birds is disposed of, or a rotating motor and a sensor are disposed on the bird feeder, this structural improvement increases the structural complexity, results in the increased manufacturing cost of the bird feeder and has a poor expelling effect.

Therefore, it needs to research a new technical solution to solve the above problem.

SUMMARY

In order to solve the defects and deficiencies of the existing technology, the present disclosure provides a bird feeder preventing food from being stolen. By designing the bird feeder and disposing leak-proof portions at feeding ports of the bird feeder, birdseed may be prevented from falling outside a food storage cavity of the bird feeder from the feeding ports. Then trays may be rotationally connected so that birds can stand stably for eating food while effectively preventing squirrels from stealing the food.

In order to implement the above purpose, the present disclosure adopts the technical solution below.

A bird feeder preventing food from being stolen, including an upper cover, a food storage pipe and a bottom cover, where the food storage pipe is provided with a food storage cavity, and the upper cover is connected to a pendant; the upper cover is connected to an upper side of the food storage pipe, and the bottom cover is connected to a lower side of the food storage pipe; feeding ports communicating with the food storage cavity are provided around a circumferential side of the bottom cover; and the bottom cover, at the feeding ports, is rotationally connected to trays.

Correspondingly to the feeding ports, the bottom cover is inwards and concavely provided with leak-proof portions, each leak-proof portion is provided with a first backstop surface extending vertically, an upper edge of the first backstop surface is externally extended with a second backstop surface, and one end, away from each first backstop surface, of each second backstop surface, is connected to each feeding port. A gap is kept between a lower part of the first backstop surface and each feeding port.

In addition, the trays are horizontally disposed, when a downward force applied to the trays is greater than 0.6 N, the trays rotate downwards around the rotating centers of the trays.

As a preferred solution, when the downward force applied to the trays is greater than 1 N, the trays rotate downwards around the rotating centers of the trays.

As a preferred solution, when inner ends of the trays are extended with rotating shafts, rotating holes adapting to the rotating shafts are formed in a lower end surface of the bottom cover, and torsional springs are sleeved on the rotating shafts.

As a preferred solution, inside the rotating holes, the lower end surface of the bottom cover is provided with limiting members; the limiting members are provided with limiting surfaces that extend downwards and vertically and are parallel to the rotating shafts; and after the trays rotate 90 degrees inside, the trays continue to rotate inside and are limited to the limiting surfaces.

As a preferred solution, a plurality of feeding ports are disposed around a circumferential direction of an outer edge of the bottom cover.

As a preferred solution, the bottom cover, correspondingly to the food storage cavity, is provided with a food equalizing portion, the food equalizing portion is cone-shaped, and the feeding ports are disposed outside the food equalizing portion.

As a preferred solution, an installation cavity is formed inside the food equalizing portion, a PCB board, a battery and a buzzer are disposed inside the installation cavity, and the PCB board is electrically connected to the battery and the buzzer; and correspondingly to the buzzer, the bottom cover is provided with a sound outlet hole.

As a preferred solution, the bottom cover, at a periphery of the food equalizing portion, is provided with water leakage holes.

As a preferred solution, the food storage pipe is a transparent glass pipe or a transparent plastic pipe.

As a preferred solution, the food storage pipe is made of wire meshes, and a plurality of mesh holes are formed outside the food storage pipe.

Compared with the existing technology, the present disclosure has obvious advantages and benefits. Specifically, it can be known that, from the above technical solution, the birdseed may be prevented from falling outside the food storage cavity of the bird feeder from the feeding ports by designing the bird feeder and disposing the leak-proof portions at the feeding ports of the bird feeder. Then the trays may be rotationally connected so that the birds can stand stably for eating food while effectively preventing the squirrels from stealing the food.

In addition, through the specific design for the food equalizing portion, the water leakage holes, and other structures, the user experience of the bird feeder may be effectively improved so as to improve the market competitiveness of the bird feeder;

And then, by disposing the buzzer, the users' requirement for expelling birds, squirrels and other animals in some user scenarios may also be met.

In order to clearly elaborate the structural features and functions of the present disclosure, the present disclosure is described in detail below in combination with drawings and specific embodiments.

REFERENCE SIGNS

Figure 1:
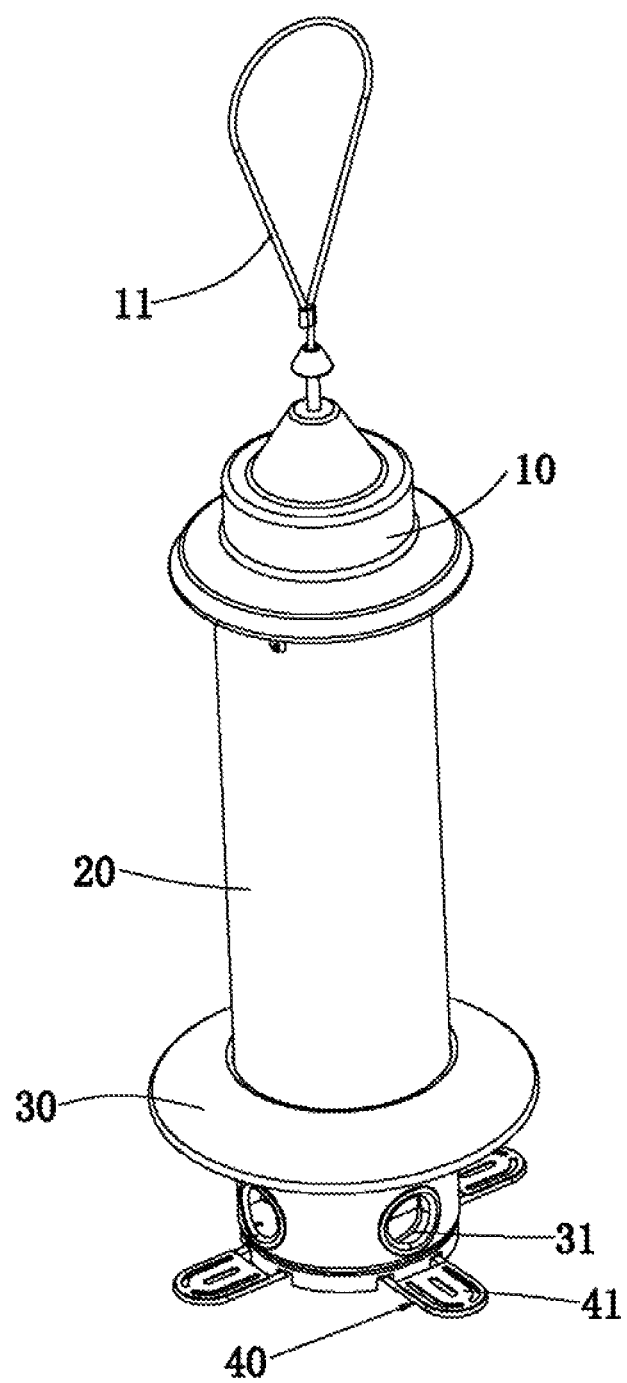
FIG. 1 is a solid schematic diagram of Embodiment I of the present disclosure.
Figure 2:
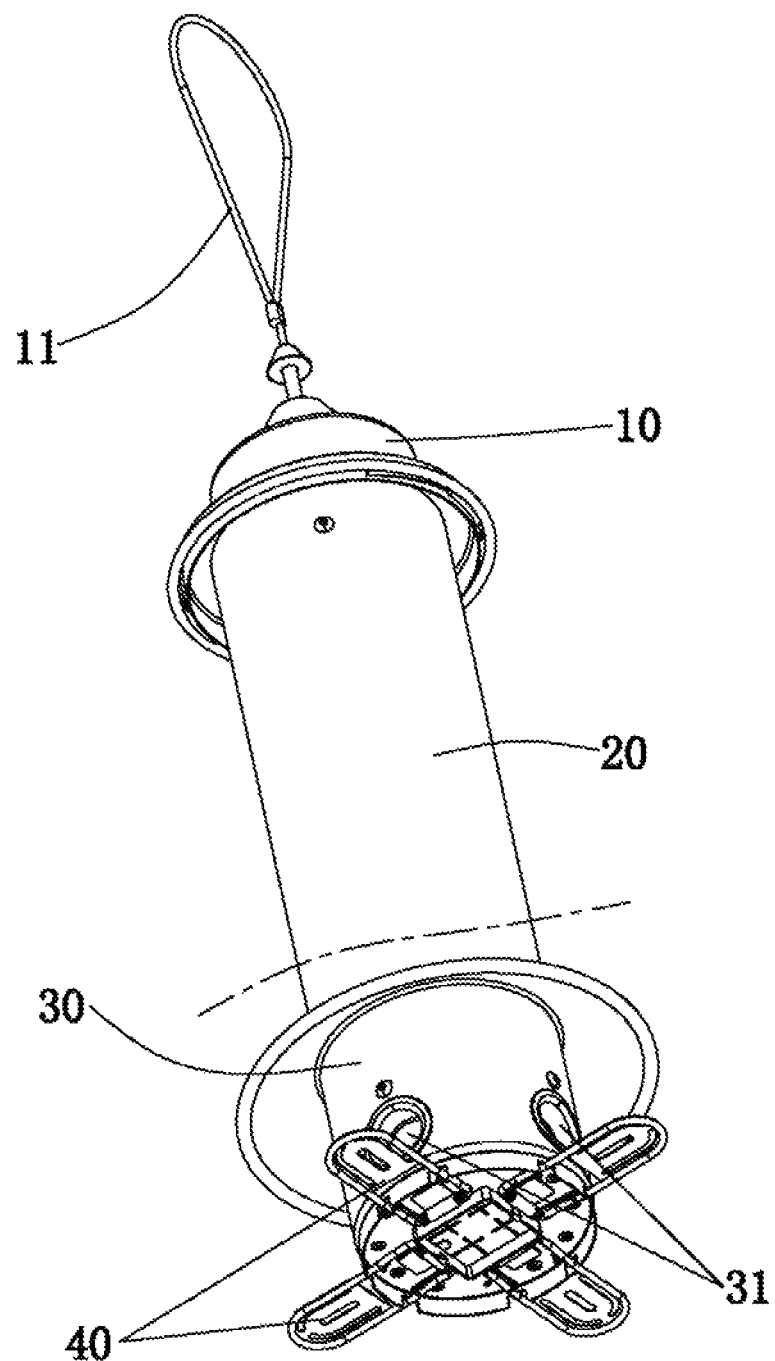
FIG. 2 is a solid schematic diagram of Embodiment I in another angle of the present disclosure.
Figure 3:
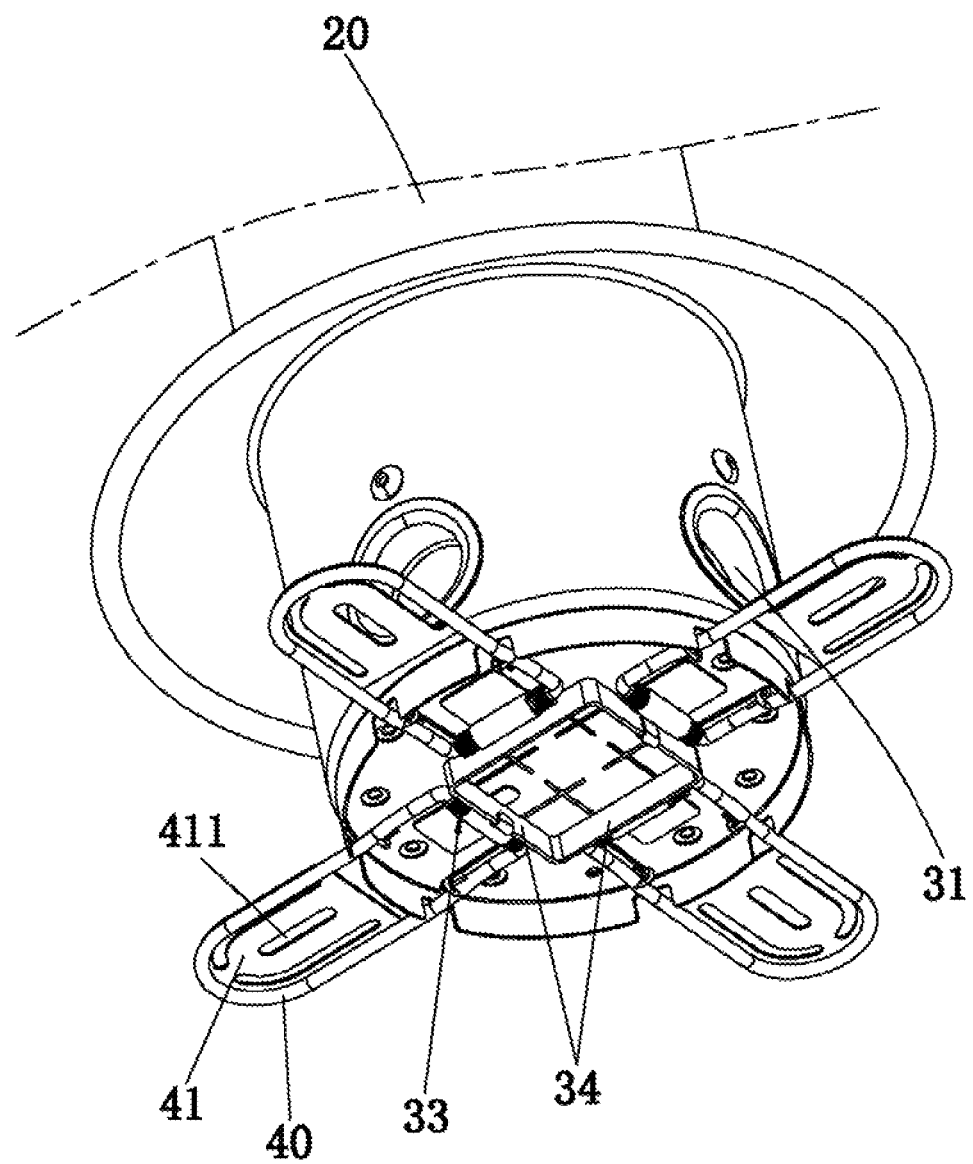
FIG. 3 is a local amplified diagram of FIG. 2.
Figure 4:
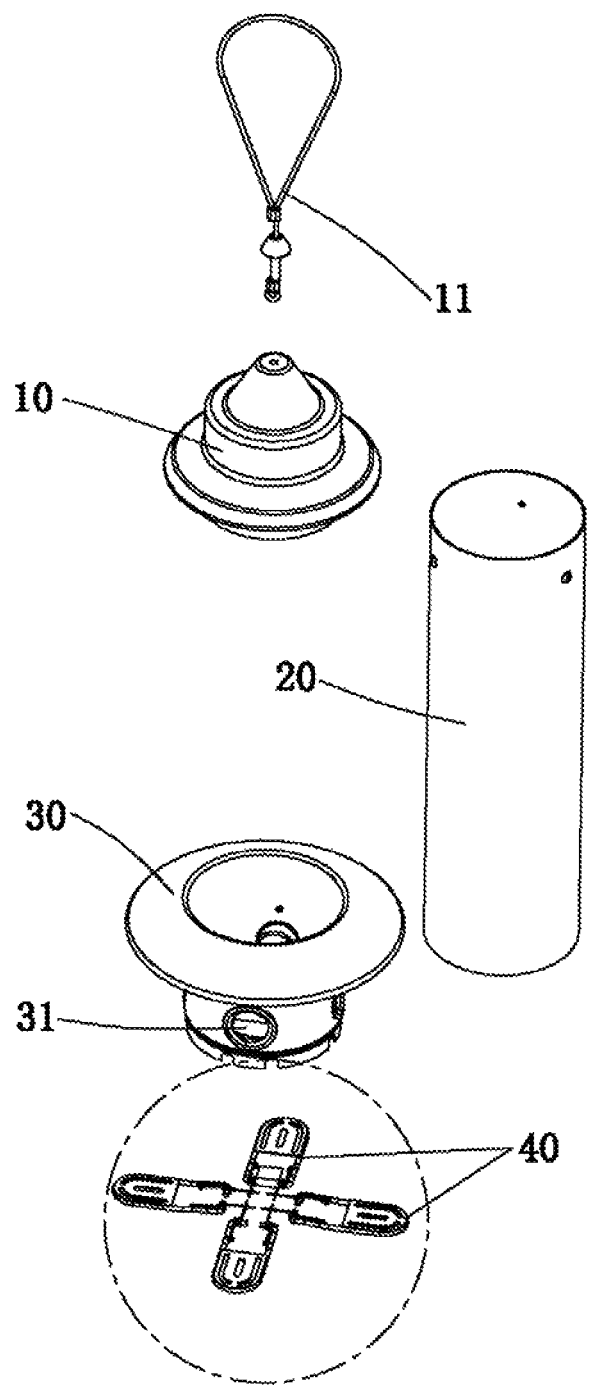
FIG. 4 is a decomposition schematic diagram of Embodiment I of the present disclosure.
Figure 5:
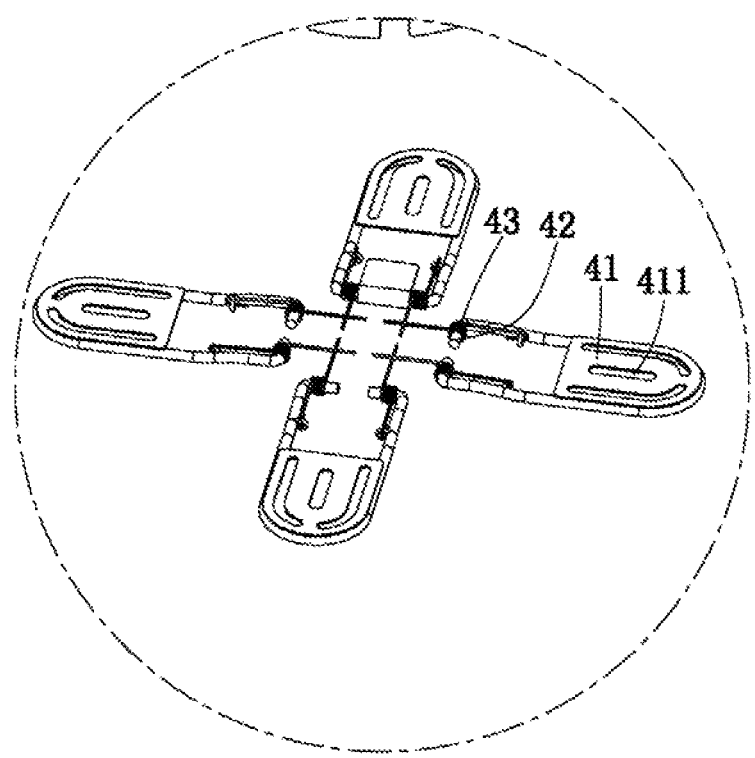
FIG. 5 is a local amplified diagram of FIG. 4.
Figure 6:
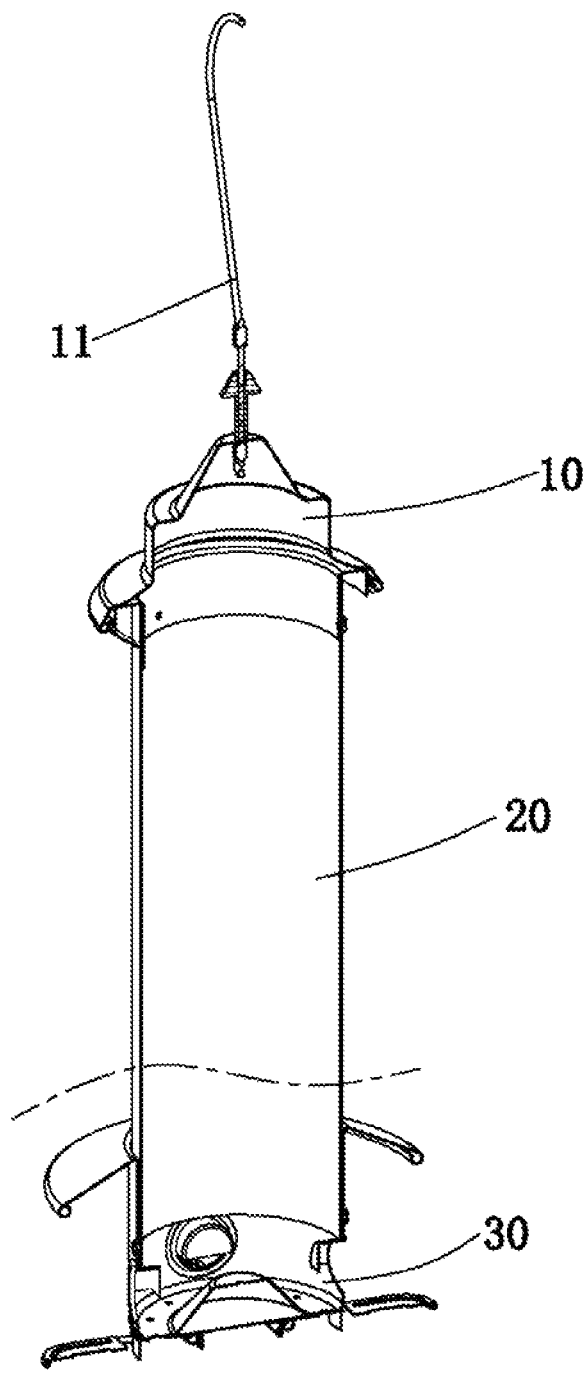
FIG. 6 is a schematic diagram of a first section of Embodiment I of the present disclosure.
Figure 7:
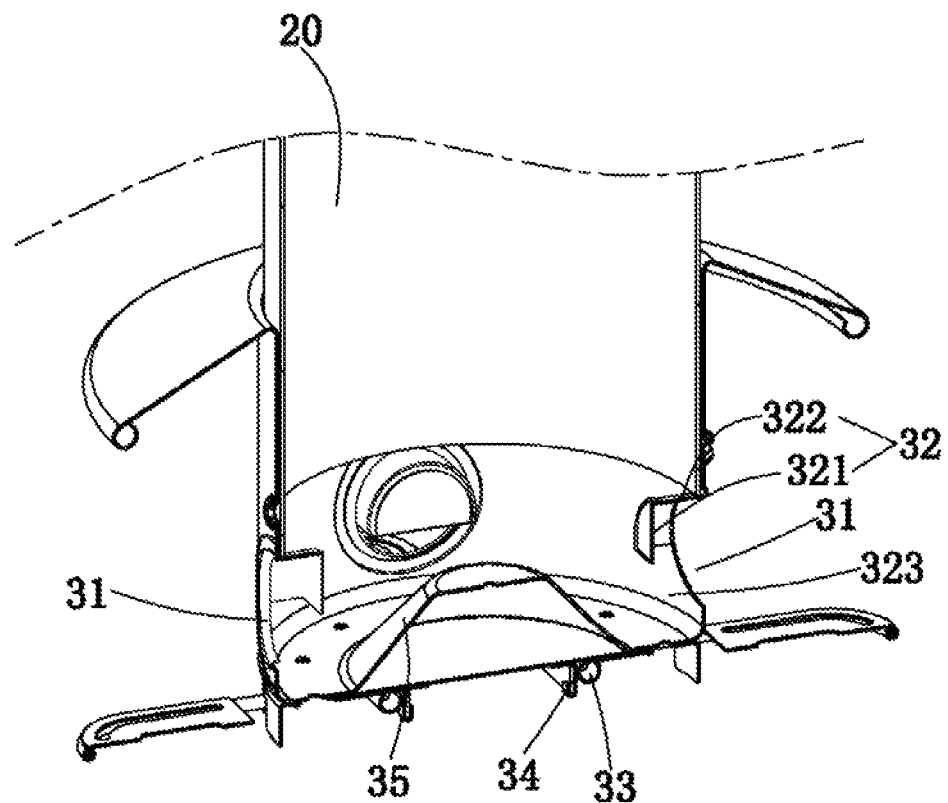
FIG. 7 is a local amplified diagram of FIG. 6.
Figure 8:
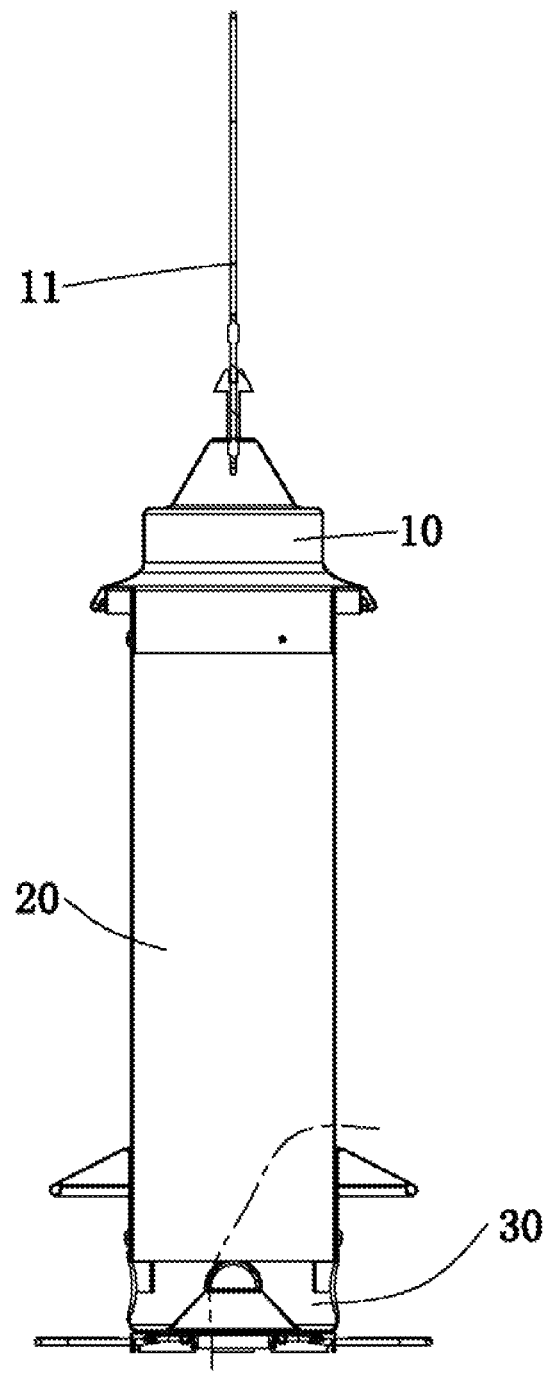
FIG. 8 is a schematic diagram of a second section of Embodiment I of the present disclosure.

10. Upper cover, 11. Pendant, 20. Food storage pipe, 30. Bottom cover, 31. Feeding port, 32. Leak-proof portion, 321. First backstop surface, 322, Second backstop surface, 323. Gap, 33. Rotating hole, 34. Limiting surface, 35. Food equalizing portion, 351. Installation cavity, 352. Battery, 353. PCB board, 354. Buzzer, 36. Water leakage hole, 37. Sound outlet hole, 40. Tray, 41. Standing plate, 411. Grabbing hole, 42. Rotating shaft, 43. Torsional spring, 50. Birdseed.

DETAILED DESCRIPTION OF THE EMBODIMENTS

The technical solutions in embodiments of the present disclosure are clearly and completely elaborated below in combination with drawings. It is apparent that the described embodiments are only preferred embodiments of the present disclosure.

It is noted that when one component is regarded as "fixed" on another component, it may be directly connected to another component, or a mediate component may exist. When one component is regarded as "connected" to another, this component may be directly connected to the other component, or a mediate component may exist simultaneously. Terms "vertical", "horizontal", "left", "right", and similar expressions used herein are merely for the purpose of description instead of the unique implementation mode.

Unless otherwise defined, all technical and scientific terms used herein have the same meanings as commonly understood by those skilled in the art. Herein, terms used in the description of the present disclosure are only for the purpose of describing specific implementation modes and not intended to limit the present disclosure. Term "and/or" used herein includes one or any and all combinations of multiple related items which are listed.

Referring to FIG. 1 to FIG. 10, a bird feeder preventing food from being stolen provided by embodiments of the present disclosure includes an upper cover 10, a food storage pipe 20 and a bottom cover 30, where the food storage pipe 20 is provided with a food storage cavity for storing birdseed, and the upper cover 10 is connected to a pendant 11; the upper cover 10 is connected to an upper side of the food storage pipe 20, and the bottom cover 30 is connected to a lower side of the food storage pipe 20; feeding ports 31 communicating with the food storage cavity are provided around a circumferential side of the bottom cover 30; and the bottom cover 30, at the feeding ports 31, is rotationally connected to trays 40.

Figure 9:
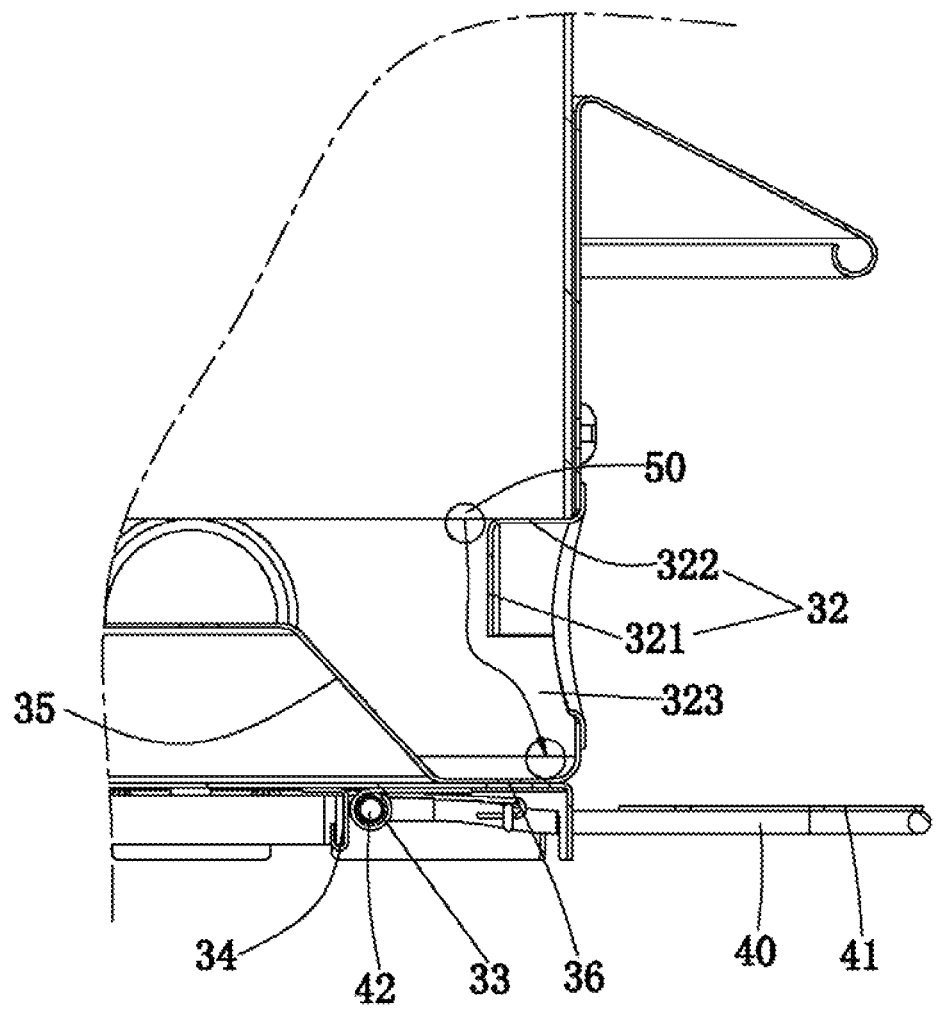
FIG. 9 is a local amplified diagram of FIG. 8.
Figure 10:
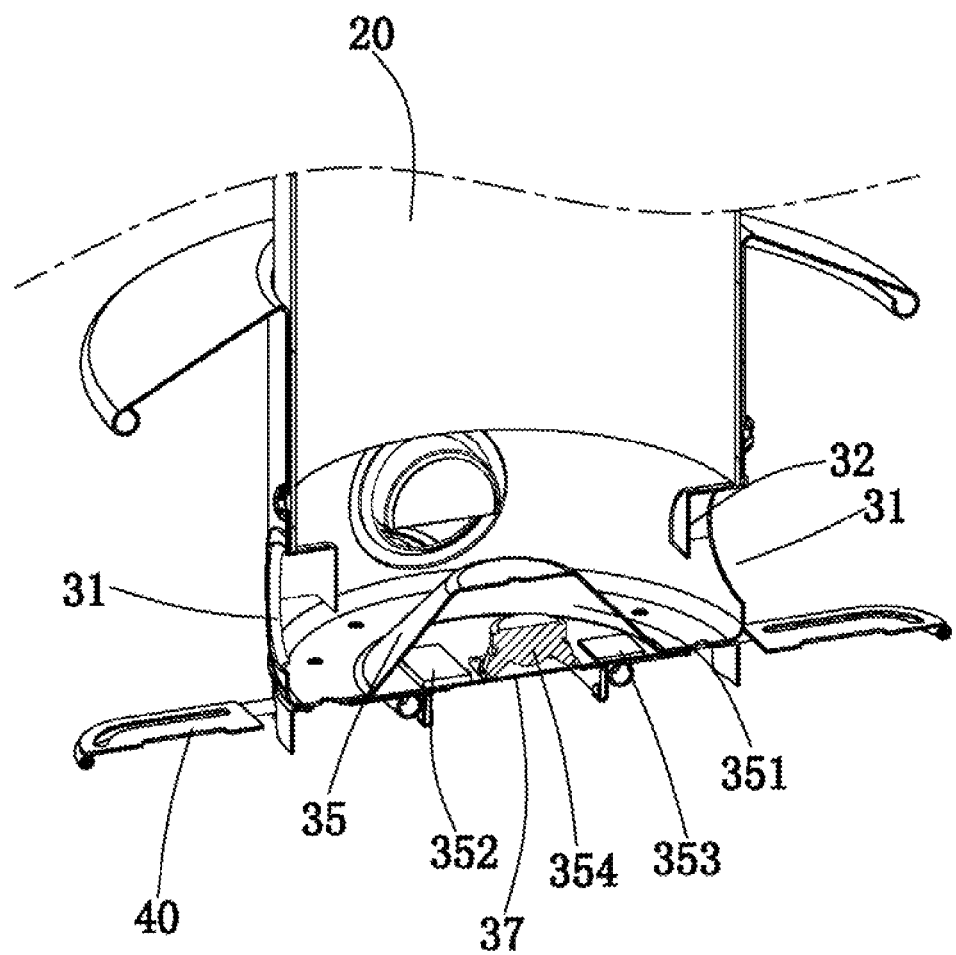
FIG. 10 is a schematic diagram of a section structure of Embodiment II of the present disclosure.

Further, referring to FIG. 9, correspondingly to the feeding ports 31, the bottom cover 30 is inwards and concavely provided with leak-proof portions 32, each leak-proof portion 32 is provided with a first backstop surface 321 extending vertically, an upper edge of the first backstop surface 321 is externally extended with a second backstop surface 322, and one end, away from each first backstop surface 321, of each second backstop surface 322, is connected to each feeding port 31, and a gap 323 (the gap 323 is communicated with each feeding port 31) is kept between a lower part of the first backstop surface 321 and each feeding port 31, so as to prevent the birdseed 50 from falling outside the food storage cavity from the feeding ports 31 directly.

In addition, the trays 40 are horizontally disposed, when a downward force applied to the trays 40 is greater than 0.6 N, the trays 40 rotate downwards around rotating centers of the trays 40.

Of course, in order to adapt to some heavy birds, when force for pushing the trays 40 to rotate downwards may be adjusted to be greater than 1 N, rotation occurs. Usually, the bird feeder is suitable for birds that are less than 100 g (the received gravity is about 1 N), even less than 60 g (the received gravity is 0.6 N). The weight of squirrel-like animal is usually greater than 150 g (the received gravity is about 1.5 N). When the squirrel-like animal stands on the trays 40, the trays 40 occur downward rotation, thus, the squirrel-like animal cannot stably stand on the trays 40, thereby playing a role in preventing squirrels from stealing food. However, when the birds stand on the trays 40, the trays 40 will not rotate due to the lighter weight of the birds, so the birds can stand on the trays 40 and eat food in the food storage cavity through the feeding ports 31.

Preferably, standing plates 41 are disposed on the trays 40, so as to be more convenient for the birds to stay on the trays 40 for eating food; moreover, for some hook-like trays 40, the squirrels can also be prevented from being hooked on the trays 40 for stealing food by designing the standing plates 41. Preferably, grabbing holes 411 adapting to bird claws are also formed in the standing plates 41, so as to further facilitate the stable staying of the birds.

Specifically, when inner ends of the trays 40 are extended with rotating shafts 42, rotating holes 33 adapting to the rotating shafts 42 are formed in a lower end surface of the bottom cover 30, the rotating shafts 42 may be rotationally assembled in the rotating holes 33, and torsional springs 43 are sleeved on the rotating shafts 42. Thus, it may implement that the trays 40 can be rotationally disposed on the bottom cover 30.

Preferably, inside the rotating holes 33, the lower end surface of the bottom cover 30 is provided with limiting members; the limiting members are provided with limiting surfaces 34 that extend downwards and vertically and are parallel to the rotating shafts 42; and after the trays 40 rotate 90 degrees inside, the trays 40 continue to rotate inside and are limited to the limiting surfaces 34, that is, the rotating angle scope of the trays 40 is limited to 90 degrees by disposing the limiting surfaces 34, so when the trays 40 rebound every time, its rebounding force will not be so great. When the squirrels press the trays 40 downwards, the deformation quantities of the torsional springs 43 may also be ensured. Thus, the stability (stability of a spring coefficient) may be ensured well, the service lives of the torsional springs 43 are prolonged, and the rotating and rebounding reliability of the torsional springs 43 is ensured.

In an actual application, a plurality of feeding ports 31 are disposed around a circumferential direction of an outer edge of the bottom cover 30; for example, in this embodiment, four feeding ports 31 are disposed around the circumferential direction of the outer edge of the bottom cover 30, correspondingly, four trays 40 are provided, four limiting surfaces 34 are provided. The four limiting surface 34 enclose a square.

Preferably, the bottom cover 30, correspondingly to the food storage cavity, is provided with a food equalizing portion 35, the food equalizing portion 35 is cone-shaped, and the feeding ports 31 are disposed outside the food equalizing portion 35. A height of the food equalizing portion 35 is greater than a distance from the feeding ports 31 to a bottom of the bottom cover 30, so food in the food storage cavity may be completely guided to the feeding ports 31 by disposing the food equalizing portion 35, that is, the food may be prevented from stacking in a bottom middle of the food storage cavity by disposing the food equalizing portion 35, resulting in a problem that the birds cannot eat the food.

In an actual application, the food storage pipe 20 may be a transparent (perspective) glass pipe, or a transparent plastic pipe (such as a PC material), so as to facilitate the birds for eat food. Of course, the food storage pipe 20 may also be made of wire meshes, and a plurality of mesh holes are formed in an outer side of the food storage pipe 20, so as to keep the food dry. Preferably, water leakage holes communicating with the food storage cavity are formed in the bottom of the bottom cover 30. Specifically, the water leakage holes are formed at a periphery of the food equalizing portion 35. When there is water in the food storage cavity, the water may drip on the ground from the water leakage holes. In an actual application, the food storage pipe 20 may be cylindrical or prismatic, such as a cuboid (pyramid).

The upper cover 10 may be connected to an upper side of the food storage pipe 20 through a turnbuckle (or screw), and the bottom cover 30 may be connected to a lower side of the food storage pipe 20 through the turnbuckle (or the screw). The upper cover 10 and the bottom cover 30 may be made of alloy materials, or may also be plastic parts; and the pendant 11 may be a rope.

Further, an installation cavity 351 is formed inside the food equalizing portion 35 (the food equalizing portion 35 may be detachably disposed on the bottom cover 30, so as to implement the installation of a buzzer and other components), a PCB board 353, a battery 352 and the buzzer 354 are disposed inside the installation cavity, and the PCB board 353 is electrically connected to the battery 352 and the buzzer 354. Correspondingly to the buzzer 354, the bottom cover 30 is provided with a sound outlet hole 37, so when the bird feeder provided by the present disclosure needs to expel the birds, the buzzer 354 may make a sound to play an expelling role; and of course, different sounds may also be set to attract the birds for eating food. A control mode that the PCB board 353 specifically controls the buzzer 354 is the existing technology, and repetition is not made herein.

The design focus of the present disclosure is as follows: by designing the bird feeder and disposing the leak-proof portions at the feeding ports of the bird feeder, the birdseed may be prevented from falling outside the food storage cavity of the bird feeder from the feeding ports; and then trays may be rotationally connected so that the birds can stand stably for eating food while effectively preventing the squirrels from stealing the food.

In addition, through the specific design for the food equalizing portion, the water leakage holes, and other structures, the user experience of the bird feeder may be effectively improved to improve the market competitiveness of the bird feeder.

The above-mentioned is only a preferred embodiment of the present disclosure instead of any limitation to the technical scope of the present disclosure. Any fine amendment, equal variation and modification made to the above embodiments based on the technical essence of the present disclosure all belong to the scope of the technical solution of the present disclosure.

What is claimed is:

1. A bird feeder preventing food from being stolen, comprising an upper cover, a food storage pipe and a bottom cover, wherein the food storage pipe is provided with a food storage cavity, and the upper cover is connected to a pendant; the upper cover is connected to an upper side of the food storage pipe, and the bottom cover is connected to a lower side of the food storage pipe; feeding ports communicating with the food storage cavity are provided around a circumferential side of the bottom cover; and the bottom cover, at the feeding ports, is rotationally connected to trays;
   correspondingly to the feeding ports, the bottom cover is inwards and concavely provided with leak-proof portions, each leak-proof portion is provided with a first backstop surface extending vertically, an upper edge of the first backstop surface is externally extended with a second backstop surface, and one end, away from each first backstop surface, of each second backstop surface, is connected to each feeding port, and a gap is kept between a lower part of the first backstop surface and each feeding port; and
   in addition, the trays are horizontally disposed, when downward force applied to the trays is greater than 0.6 N, the trays rotate downwards around rotating centers of the trays;
   wherein a plurality of feeding ports are disposed around a circumferential direction of an outer edge of the bottom cover, the bottom cover, correspondingly to the food storage cavity, is provided with a food equalizing portion, the food equalizing portion is cone-shaped, and the feeding ports are disposed outside the food equalizing portion.

2. The bird feeder preventing the food from being stolen according to claim 1, wherein when the downward force applied to the trays is greater than 1 N, the trays rotate downwards around the rotating centers of the trays.

3. The bird feeder preventing the food from being stolen according to claim 2, wherein when inner ends of the trays are extended with rotating shafts, rotating holes adapting to the rotating shafts are formed in a lower end surface of the bottom cover, and torsional springs are sleeved on the rotating shafts.

4. The bird feeder preventing the food from being stolen according to claim 3, wherein inside the rotating holes, the lower end surface of the bottom cover is provided with limiting members; the limiting members are provided with limiting surfaces that extend downwards and vertically and are parallel to the rotating shafts; and after the trays rotate 90 degrees inside, the trays continue to rotate inside and are limited to the limiting surfaces.

5. The bird feeder preventing the food from being stolen according to claim 1, wherein the bottom cover is provided with water leakage holes at a periphery of the food equalizing portion.

6. The bird feeder preventing the food from being stolen according to claim 1, wherein an installation cavity is formed inside the food equalizing portion, a PCB board, a battery and a buzzer are disposed inside the installation cavity, and the PCB board is electrically connected to the battery and the buzzer; and correspondingly to the buzzer, the bottom cover is provided with a sound outlet hole.

7. The bird feeder preventing the food from being stolen according to claim 1, wherein the food storage pipe is a transparent glass pipe or a transparent plastic pipe.

\* \* \* \* \*